(12) United States Patent
Meador

(10) Patent No.: US 6,486,230 B1
(45) Date of Patent: Nov. 26, 2002

(54) POLYESTERS BY PHOTOCHEMICAL CYCLOPOLYMERIZATION

(75) Inventor: Michael A. Meador, Strongsville, OH (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 99 days.

(21) Appl. No.: 09/827,089

(22) Filed: Apr. 5, 2001

(51) Int. Cl.$^7$ .................................................. C08F 2/46
(52) U.S. Cl. ...................... 522/180; 522/181; 522/182; 528/220; 526/316
(58) Field of Search ............................ 522/36, 37, 182, 522/180, 181; 528/220; 526/316

(56) References Cited

U.S. PATENT DOCUMENTS 4,070,259 A * 1/1978 De Poortere et al.
6,140,385 A   10/2000 Bowers et al. ................ 522/37

OTHER PUBLICATIONS

Macromolecules vol. 29, No. 27, pp. 8983–8986.
Ultraviolet Curing of Polymers, NASA Tech Briefs, Mar. 1999.
NASA News, Sampe Jour. vol. 36, No. 5, Sep. 2000.

* cited by examiner

Primary Examiner—Susan W. Berman
(74) Attorney, Agent, or Firm—Kent N. Stone

(57) ABSTRACT

The polyesters of this invention are derived from a Diels-Alder cyclopolymerization of a photochemically generated bisdiene with dienophiles, such as di(acrylates), tri(acrylates), di(methacrylates), tri(methacrylates) and mixtures thereof with mono(methacrylates) or mono(acrylate) end-caps. Irradiation of one or more diketones produces two distinct hydroxy o-quinodimethane (photoenol) intermediates. These intermediates are trapped via a Diels-Alder cycloaddition with appropriate dienophiles, e.g., di(acrylates) to give the corresponding in polyesters quantitative yields. When di(acrylates), tri(acrylates) and di and tri(methacrylates) or mixtures thereof with monoacrylate end-caps are used as the dienophile, the resulting polyesters have glass transition temperatures (Tg) as high as 200° C. Polyesters films can be prepared by ultraviolet irradiation of high solids content varnishes of the monomers in a small amount of solvent, e.g., cyclohexanone, dimethyl formamide, N-methylpyrollidone and the like. These polyesters, i.e. polyesters are characterized as having high glass transition temperatures, good mechanical properties and improved processing in the manufacture of composites, adhesives, electronic materials and films.

33 Claims, No Drawings

POLYESTERS BY PHOTOCHEMICAL CYCLOPOLYMERIZATION

ORIGIN OF THE INVENTION

The invention described herein was made by an employee of the United States Government and may be manufactured and used by or for the Government for governmental purposes without the payment of any royalties thereon or therefore.

BACKGROUND OF THE INVENTION

1. Field of the Invention

Polymers having high-temperature characteristics are required to improve the performance and to reduce the weight of industrial materials in electronic devices, aeronautical equipment and some machinery. The polyamides and polyesters are polymers known to have the required mechanical strength, dimensional stability, low coefficient of thermal expansion, and electrical insulation properties in addition to high-temperature resistance.

The preparation of high performance polymers, however, requires cure temperatures in excess of 200° C. This leads to high tooling costs, high processing costs, and processing induced thermal stresses that can compromise component durability. The process of this invention allows the curing of high performance polyimides and polyesters at or near room temperature. This invention enables the cure of high performance polyimides and polyesters at or near room temperature by using ultraviolet light or some other radiation sources, such as electron beams rather than heat to provide the cure energy. Specifically, this invention relates to the Diels-Alder cyclopolymerization of a photochemically generated diene with dienophiles, such as di(acrylates), tri(acrylates), di(methacrylates), tri(methacrylates), and mixtures thereof with monoacrylates. Irradiation of aromatic diketones produces two distinct hydroxy o-quinodimethane (photoenol) intermediates. The intermediates are trapped via a Diels-Alder cycloaddition with appropriate dienophiles, e.g. di(acrylates) and/or tri(acrylates) to give the corresponding polyesters in quantitative yields. When acrylates such as di(acrylate) or di(methacrylate) are used as the bisdienophile, the resulting polyesters of this invention were found to have glass transition temperatures, (Tg), as high as 200° C.

2. Description of the Prior Art

The preparation of high performance polymers such as the polyimides and polyesters are typically prepared by condensation reactions. In the case of polyimides, the reaction involves diamines and dianhydrides or dianhydride derivatives e.g., the diester of tetracarboxylic acids. This process suffers from several problems in that aromatic diamines are toxic, mutagenic, or carcinogenic. Safe handling and disposal of these material requires the implementation of costly engineering controls. Further, processing of condensation reaction systems also can be a problem, since this chemistry leads to low molecular weight by-products, e.g., water and alcohols. Evolution of these by-products and high processing temperatures lead to voids and defects in the polymer and composites prepared with these polymers.

Some of these processing problems can be overcome, however, by combining addition chemistry with condensation chemistry, as is the case for PMR-15 polyimides. With this approach, low molecular weight oligomers (short chain polymers) are prepared by the condensation of diamines with dianhydrides or their derivatives and a suitable endcapping group. The endcaps undergo a cross-linking reaction at high temperatures (typically in excess of 300° C.) to provide a polymer network having good solvent resistance and high temperature performance. Prior to cross-linking, however, the imide oligomers are somewhat fluid and volatile condensation by-products can be removed from the polymer. While this approach overcomes some of the processing difficulties, it requires higher processing temperatures and monomer toxicity is still a concern.

It is known in the prior art that Diels-Alder polymerization reactions have been used to prepare high performance polymers such as the polyimides and polyacrylates. Typical Diels-Alder reactions used to obtain polyimides have involved the reaction of a bismaleimide with a suitable bisdiene such as a bisfuran. Other Diels-Alder reactions use a bisdiene precursor, such as a bis(benzocyclobutane), that forms the bisdiene upon heating to temperatures of 250° C. or higher. Using these Diels-Alder cyclopolymerization reactions overcome the health and safety problems associated with other methods of preparing polyimides, since these reactions do not involve the use of aromatic amines as one of the reactants. However, these methods still require high cure and processing temperatures, see, for example, U.S. Pat. Nos. 5,338,827; 5,322,924; 4,739,030 and the Annual Reviews in Materials Science, 1998, 28, 599–630 by M. A. Meador.

In the case of polyesters, these systems are generally prepared by a polycondensation process involving the reaction of diols and diacids or diesters producing water or alcohol as byproduct. Unsaturated polyesters are similarly prepared with the exception that the diacids are unsaturated. It is known also that ethylenically unsaturated compounds, and in particular acrylate derivatives, can be polymerized by irradiation with ultraviolet light in the presence of a photoinitiating system. The photoinitiating system includes a diaryl ketone photoinitiator and a coinitiator, i.e. a molecule that serves as a hydrogen donor. The coinitiators are typically alcohols, or ethers which have available hydrogens attached to carbon atoms adjacent to heteroatoms.

SUMMARY OF THE INVENTION

The unique feature of this invention is that the process employs energy from ultraviolet light, rather than heat to form the polymers. While other radiation curable polymers have been developed, these methods employ either free radical or cationic-based polymerization chemistries. The present invention utilizes photochemically generated dienes (not free radicals or carbocations) and standard Diels-Alder cycloaddition chemistry in the polymerization process.

More specifically, this invention relates to polyesters i.e. polyacrylates and to the method of preparing these polymers derived from the photochemical cyclopolymerization of stoichiometric amounts of at least one aromatic diketone having the formula:

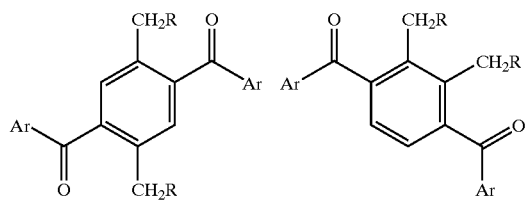

-continued

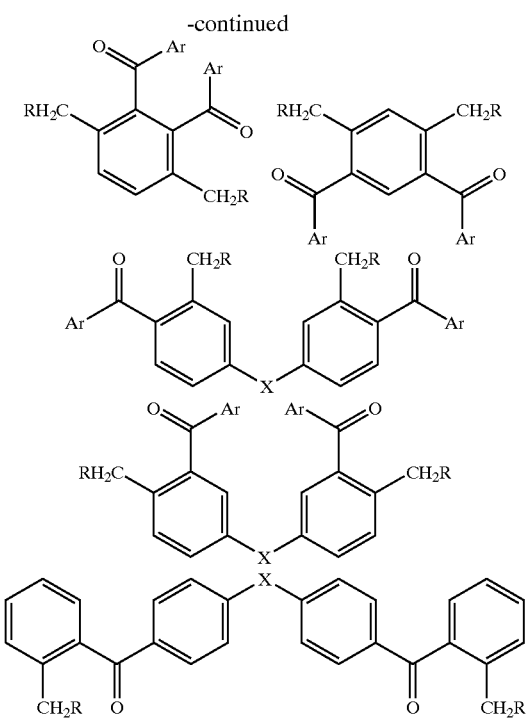

wherein Ar is the same or a different aromatic or substituted aromatic radical e.g., a lower alkyl substitutent and R is the same or a different radical selected from the group consisting of hydrogen, aromatic radicals, substituted aromatic radicals, lower alkyl radicals of 1 to 8 carbons, $O_2CR_1$ and $-OR_2$ radicals where $R_1$ and $R_2$ are the same or different organic radicals selected from the group consisting of lower alkyl radicals of 1 to 8 carbons e.g. 1 to 4 carbons, aryl and substituted aryl radicals and x in the diketone formula is selected from the group consisting of nil, oxygen, sulfur, $-C=O$, $-CH_2-$, alkyl radicals of 1 to 8 carbons, ether radicals, aryl radicals and substituted aryl radicals with at least one dienophile selected from the group consisting of di(acrylates), tri(acrylates), di(methacrylates), tri (methacrylates) and mixtures of monoacrylates or mono (methacrylates) with the di(methacrylates), tri (methacrylates), di(acrylates) and/or tri(acrylates) wherein the monoacrylates range from 0 to about 25 molar percent of the mixture to obtain polyacrylates having glass transition temperatures (Tg) as high as 200° C., high thermal-oxidative stability and decomposition-stability temperatures ranging up to about 300° C.

Accordingly, it is an object of this invention to employ energy from ultraviolet light rather than heat to obtain polyesters having glass transition temperatures as high as 200° C.

It is another object of this invention to provide a novel method of preparing polyesters at ambient temperatures by using radiant energy to photochemically cyclopolymerize aromatic diketones and one or more acrylic dienophiles.

It is another object of this invention to provide a method of preparing radiation curable polyesters that do not have the health risk associated with conventional methods.

It is a further object of this invention to provide polyesters and a novel process of preparing cured polyesters by using radiation energy at ambient temperatures to obtain acrylic polymers derived from the polymerization of at least one aromatic diketone and acrylic dienophiles without using free radical or cationic polymerization methods.

These and other objects of this invention will become apparent from a further and more detailed description of the invention as follows:

DESCRIPTION OF THE PREFERRED EMBODIMENTS

This invention enables the curing of high performance polymers at or near room temperature by using ultraviolet light (or some other radiation sources, such as electron beams) rather than heat to provide the cure energy. In general, the invention involves the Diels-Alder cyclopolymerization of photochemically generated bisdienes with acrylic dienophiles. The general chemistry is described in Scheme 1, for a representative polyimide and polyacrylate. The irradiation of the aromatic diketone produces two distinct hydroxy o-quinodimethane (photoenol) intermediates. These intermediates are trapped via a Diels-Alder cycloaddition with appropriate dienophiles, e.g., di(acrylate), added prior to irradiation, to give the corresponding polymers in quantitative yields. When di(acrylates) or tri(acrylates) are used as the dienophile, the resulting polyesters have glass transition temperatures, (Tg) as high as 200° C. depending upon the structures of the diketone and acrylates. Recent lab work has demonstrated that good polyacrylate films can be prepared by ultra-violet radiation of high solids content varnishes of the appropriate monomers in a small amount of various solvents, e.g. cyclohexanone, dimethyl formamide, N-methylpyrollidone and the like.

The general chemistry for the preparation of either the polyesters or polyimides from Diels-Alder trapping of photochemically generated bisdiene intermediates is shown (Scheme1) as follows:

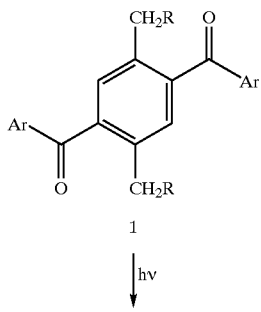

1

↓ hv

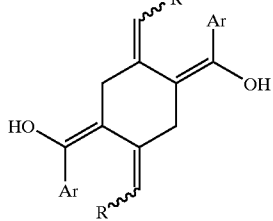

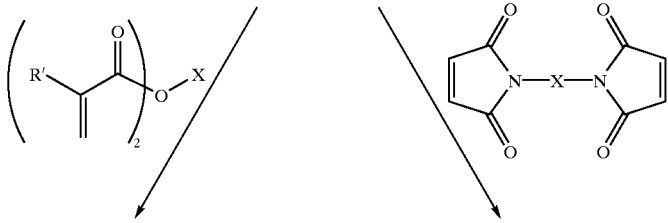

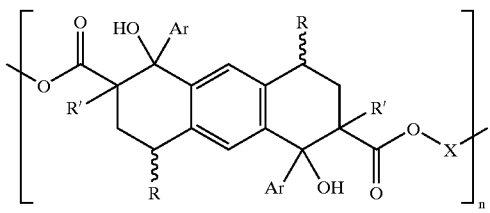

3
POLYACRYLATES

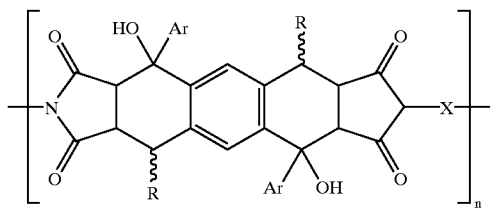

2
POLYIMIDES

For purpose of this invention, the other diketones used in preparing the polyacrylates, as in Scheme 1, include the following seven aromatic diketones:

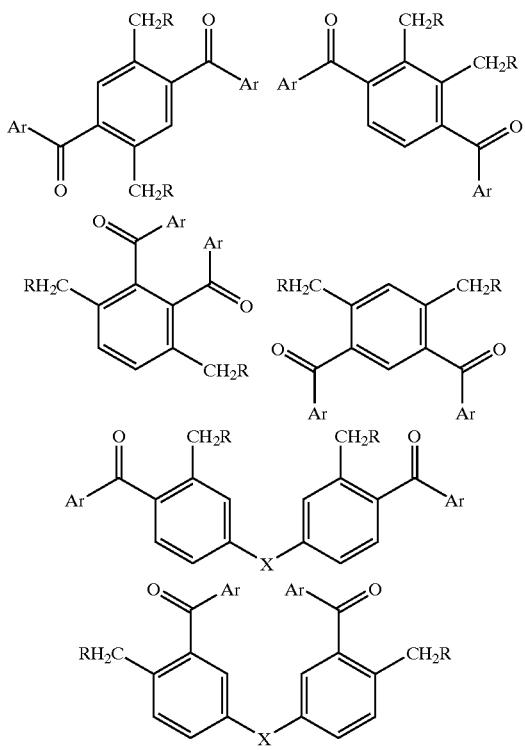

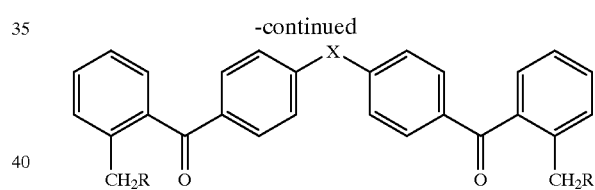

wherein Ar is the same or a different aromatic or substituted aromatic radical e.g. lower alkyl substitutents and R is the same or a different radical selected from the group consisting of hydrogen, aromatic radicals, substituted aromatic radicals, lower alkyl radicals of 1 to 8 carbons, $O_2CR_1$ and $-OR_2$ radicals wherein $R_1$ and $R_2$ are the same or different radicals selected from the group consisting of lower alkyl radicals of 1 to 8 carbons, e.g. 1 to 4 carbons, aryl and substituted aryl radicals, and X in the diketone formulae is selected from the group consisting of nil, oxygen, sulfur, $-C=O$, $CH_2$, primary, secondary or tertiary alkyl radicals of 1 to 8 carbons, aromatic radicals, substituted aromatic radicals, primary, secondary or tertiary ethers, poly(ethers), esters, poly(esters) and poly(aryls), having the formula:

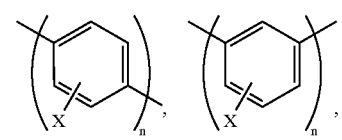

-continued

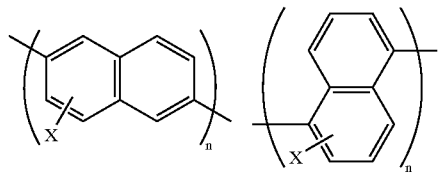

wherein n has the value of 1 or 2, and X in the poly(aryl) formulae is a lower alkyl substitutent or nil.

The bisacrylates and bis(methacrylates) have a formulae selected from the group consisting of:

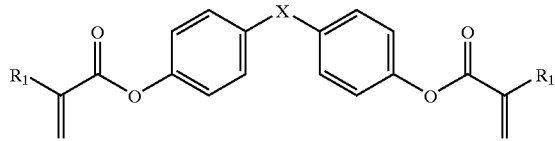

AND

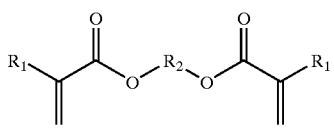

wherein X is selected from the group consisting of oxygen, C=O, $SO_2$, $CH_2$, nil, ether radicals, poly(ether) radicals, ester radicals, polyester radicals, aromatic and poly (aromatic) radicals; and $R_1$ is selected from the group consisting of hydrogen, alkyl radicals of 1 to 8 carbons; and $R_2$ is selected from the group consisting of alkyl(primary, secondary, or tertiary) radicals, ether radicals, poly(ether) radicals, ester radicals, and poly(ester radicals).

In addition to di(acrylates) and tri(acrylates), any of the di(methacrylates) or tri(methacrylates) can be used as the dienophile either alone or as a mixture with the tri(acrylates) and di(acrylates) in any molar ratio and further with the monoacrylates or mono(methacrylates) wherein the end-cap monoacrylates range from 0 to about 25 molar percent of the mixture. Structures of these tri(acrylic) dienophiles include, for example, the following:

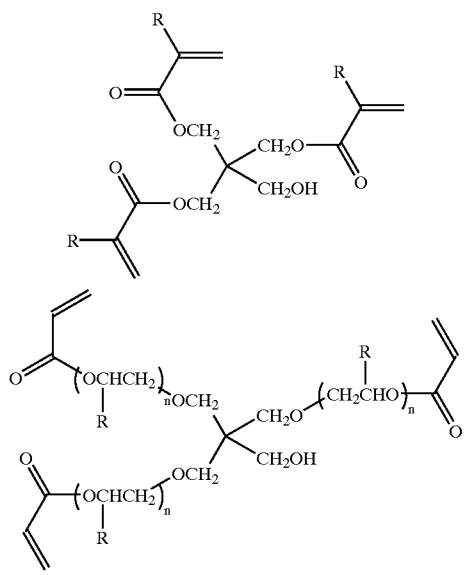

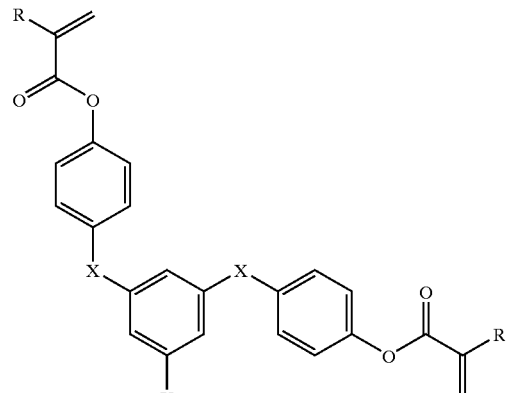

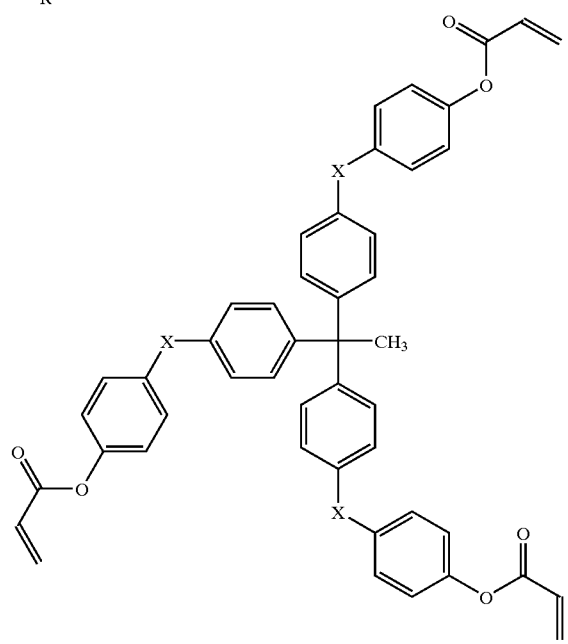

wherein R in the tri(acrylic) dienophiles is selected from the group consisting of hydrogen and $CH_3$ and X is selected from the group consisting of nil, oxygen, —$CH_2$, and —C=O radicals.

Examples of the end-cap monoacrylates and methacrylates, known in the art include monomers, such as acrylic and methacrylic acids, and the amides, esters, and salts thereof. Specific mono(acrylic) monomers include, for example, methyl acrylate, ethyl acrylate, methyl methacrylate, butylacrylate, hydroxy ethylacrylate, hydroxy propylacrylate, the glycol acrylates, e.g. hexamethylene glycol dimethacrylate, allyl methacrylate, diallyl methacrylate, and the epoxy acrylates, e.g. glycidyl methacrylate and the like.

More specifically, the polyesters of this invention are derived from the photochemical cyclopolymerization at ambient temperatures of approximately stoichiometric amounts of at least one
  (a) aromatic diketone selected from the group consisting of

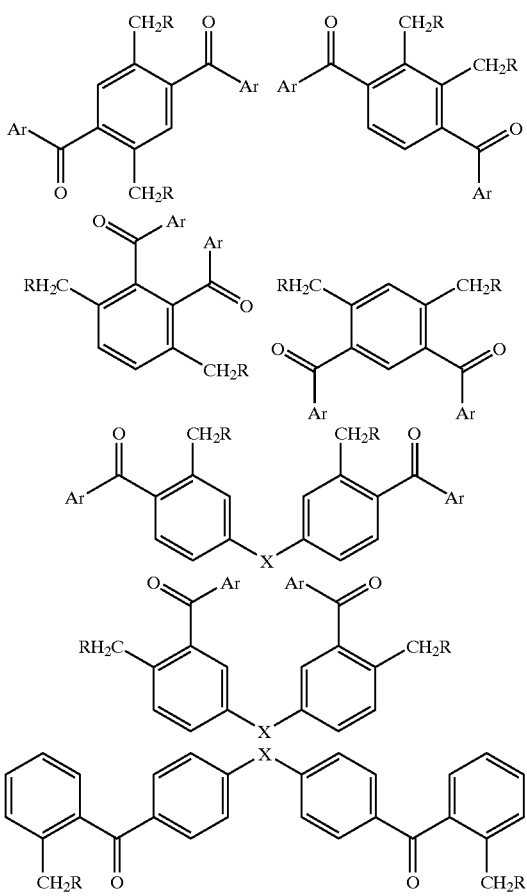

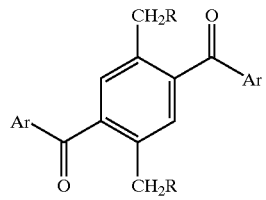

wherein Ar is the same or a different aromatic or substituted aromatic radical e.g. lower alkyl substitutents and R is the same or a different radical selected from the group consisting of hydrogen, aromatic radicals, e.g. substituted aromatic radicals, lower alkyl radicals of 1 to 8 carbons, $O_2CR_1$ and $-OR_2$ radicals wherein $R_1$ and $R_2$ are the same or different radicals selected from the group consisting of lower alkyl radicals of 1 to 8 carbons e.g. 1 to 4 carbons and aryl and substituted aryl radicals, and X in the diketone formulae is selected from the group consisting of nil, oxygen, sulfur, $-C=O$, $-CH_2$, alkyl radicals of 1 to 8 carbons, ether or poly(ether) radicals, ester or poly(ester) radicals, and aryl or poly(aryl) radicals with at least one (b) dienophile selected from the group consisting of di(acrylates), tri(acrylates), di- and tri(methacrylates) and mixtures of di(acrylates) and/or tri(acrylates) and/or di- and tri(methacrylates) with monoacrylates in molecular ratios of 0 to about 25 molar percent of the mixture to obtain polyacrylates having glass transition temperatures (Tg) ranging up to about 200° C., high thermal-oxidative stability and decomposition-stability temperatures ranging up to about 300° C.

Preferably, the polyesters of this invention are derived by a process of photochemically cyclopolymerizing with ultraviolet light at ambient temperatures approximately stoichiometric amounts of an (a) aromatic diketone having the formula:

wherein Ar is the same or a different aromatic or substituted aromatic radical and R is the same or different radical selected from the group consisting of hydrogen, aromatic radicals, lower alkyl radicals of 1 to 8 carbons, $O_2CR_1$ and $-OR_2$ radicals wherein $R_1$ and $R_2$ are the same or different radicals selected from the group consisting of lower alkyl radicals of 1 to 8 carbons, and aryl radicals, and (b) at least one acrylic dienophile selected from the group consisting of di(acrylates), tri(acrylates), di(methacrylates), tri(methacrylates) and mixtures thereof in any molar ratio with 0 to about 25 molar percent of at least one end-cap monoacrylate or mono (methacrylate).

The following examples illustrate the novel process of obtaining polyesters and polyimides by photochemically cyclopolymerizing diketones and dienophils at ambient temperatures.

EXAMPLE 1

A benzene solution containing an equimolar amount of 4,4'-bis(2-methylbenzoyl)diphenyl ether and 4,4'-bismaleimido diphenylmethane were degassed under nitrogen for 1 hour. The resulting stirred solution was irradiated under a nitrogen atmosphere for 18 hours using ultraviolet light from a 250 Watt medium pressure Mercury vapor lamp filtered through Pyrex. The solvent was removed under vacuum and the resulting residue triturated with methanol and filtered to afford polyimide (100% yield).

Infrared analysis (KBr pellet) showed the absence of the diketone carbonyl at 1655 cm$^{-1}$ indicating complete reaction of the diketone and the appearance of imide carbonyl peaks at 1711 and 1778 cm$^{-1}$ confirming formation of the desired polyimide. Thermal analysis of the polyimide shows a Tg of 184° C. (measured by Differential Scanning Calorimetry) and an onset of decomposition, Td, of 321° C. (measured by Thermal Gravimetric Analysis).

EXAMPLE 2

A 10 wt % solution of an equimolar amount of 2,5-dibenzoyl-1,4-dimethylbenzene and the bismaleimide of Bis-aniline-P in cyclohexanone was placed in a Petri Dish. The solvent was allowed to evaporate in a fume hood and the resulting gummy film was placed in a sealed chamber fitted with a quartz window and degassed with argon for about 2 minutes. The chamber was placed on the conveyor belt of a thin film uv curing apparatus and irradiated for a total of 20 passes (approximately 20 minute exposure time) using light from a broad spectrum ultraviolet-visible lamp (irradiation spectrum ranged from 200 to 580 nm, with a maximum at 360 nm). The Petri dish was removed from the sample chamber and heated overnight (approximately 18 hours) in a vacuum oven at 80° C. to remove any residual solvent.

Infrared analysis (NaCl plates) of the resulting film showed no benzophenone carbonyl at 1655 cm$^{-1}$ indicating complete reaction of the diketone and the appearance of imide carbonyl peaks at 1778 and 1711 cm$^{-1}$ confirming formation of polyimide. Thermal analysis of this film showed at Tg at 170° C. (measured by Differential Scanning Calorimetry) and an onset of decomposition at 220° C. (measured by Thermal Gravimetric Analysis).

EXAMPLE 3

A benzene solution containing an equimolar amount of 2,5-dibenzoyl-1,4-dimethylbenzene and 1,4-butanediol diacrylate were degassed under nitrogen for 1 hour. The resulting stirred solution was then irradiated under a nitrogen atmosphere for 18 hours using ultraviolet light from a 250 Watt medium pressure Mercury vapor lamp filtered through Pyrex. The solvent was removed under vacuum and the resulting residue triturated with methanol and filtered to afford the corresponding polyester (100% yield).

Infrared analysis (KBr pellet) shows the absence of the diketone carbonyl at 1655 cm$^{-1}$ indicating complete reaction of the diketone and the appearance of an ester carbonyl absorption at 1750 cm$^{-1}$ confirming formation of the desired polyester. Thermal analysis of the polyester shows a Tg of 160° C. (measured by Thermal Mechanical Analysis) and an onset of decomposition, Td, of 308° C. (measured by Thermal Gravimetric Analysis).

EXAMPLE 4

A 10 wt % cylohexanone solution of 2,5-dibenzoyl-1,4-dimethylbenzene and a mixture of pentacrytritol propoxylate triacrylate and 1,6-hexanediol ethoxylate diacrylate in the proper stoichiometry was placed in a Petri Dish. The solvent was allowed to evaporate in a fume hood and the resulting gummy film was placed in a sealed chamber fitted with a quartz window and degassed with argon for about 2 minutes. The chamber was placed on the conveyor belt of a thin film uv curing apparatus and irradiated for a total of 20 passes (approximately 20 minute exposure time) using light from a broad spectrum ultraviolet-visible lamp (irradiation spectrum ranged from 200 to 580 nm, with a maximum at 360 nm). The Petri dish was removed from the sample chamber and heated overnight (approximately 18 hours) in a vacuum oven at 80° C. to remove any residual solvent.

Infrared analysis (NaCl plates) of the resulting film showed no benzophenone carbonyl at 1655 cm$^{-1}$ indicating complete reaction of the diketone and the appearance of an ester carbonyl at about 1750 cm$^{-1}$ confirming formation of the polyester. Thermal analysis of this film showed at Tg at 50° C. (measured by Differential Scanning Calorimetry) and an onset of decomposition at 210° C. (measured by Thermal Gravimetric Analysis).

The ultraviolet-curing process of this invention offers several advantages over other processes for the preparation of polyimides and polyesters. Ultraviolet cured films, for example, undergo less shrinkage during cure in comparison to films that are cured at high temperatures. Moreover, this process would be particularly useful for curing polyimides or polyesters that contain thermally sensitive organic groups or additives as nonlinear optical materials. In addition, this process does not entail some of the disadvantages of the condensation-chemistry-process; namely, the formation of volatiles during cure, health risks associated with aromatic diamines in preparing polyimides, and poor solution stability. Specifically, the polyimides and polyesters of this invention are characterized as having high glass transition temperatures, good mechanical properties and improved processing in the manufacture of composites, adhesives, electronic materials and films. The polyesters are particularly useful in preparing fiber reinforced composites used as the preferred structural materials in military and civil applications such as jet engine cowls and ducts, because of their light-weight and load-bearing characteristics and their oxidative stability at high temperatures.

While this invention has been described by a number of specific examples, it is obvious that there are other variation and modification that can be made without departing from the spirit and scope of the invention as set forth in the appended claims.

The invention claimed:

1. Polyesters derived from the photochemical cyclopolymerization of approximately stoichiometric amounts of at least one (a) aromatic diketone selected from the group consisting of

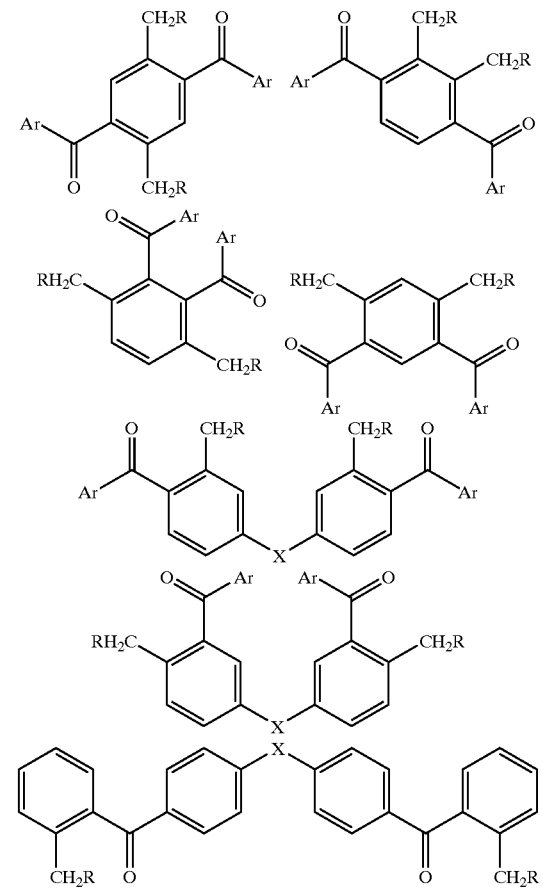

wherein Ar is the same or a different aromatic or substituted aromatic radical and R is the same or a different radical selected from the group consisting of hydrogen, aromatic radicals, lower allyl radicals of 1 to 8 carbons, O$_2$CR$_1$ and —OR$_2$ radicals wherein R$_1$ and R$_2$ are the same or different radicals selected from the group consisting of lower alkyl radicals of 1 to 8 carbons, and aryl radicals, and X is selected from the group consisting of nil, oxygen, sulfur, C=O, —CH$_2$, alkyl radicals of 1 to 8 carbons, ether radicals, ester radicals, and aryl radicals with at least one (b) dienophile selected from the group consisting of di(acrylates), tri(acrylates), di(methacrylates), tri (methacrylates) and mixtures of di(acrylates), tri (acrylates), di(methacrylates), tri(methacrylates) in any molar ratio with a mono(acrylate) wherein the mono (acrylate) range from 0 to about 25 molar percent of the mixture to obtain polyesters having glass transition temperatures (Tg) ranging up to about 200° C., high thermal-oxidative stability and decomposition-stability temperatures ranging up to about 300° C.

2. The polyesters of claim 1 wherein the diketones and the dienophiles are photochemically cyclopolymerized with ultraviolet light at wavelengths above 300 nm.

3. The polyesters of claim 1 wherein the dienophile is di(acrylate).

4. The polyesters of claim 1 wherein the dienophile is tri(acrylate).

5. The polyacrylates of claim 1 wherein the dienophile is a mixture of di(acrylates), di(methacrylates), tri(acrylates), and/or tri(methacrylates) with mono(methacrylates or mono (acrylates).

6. The polyesters of claim 1 wherein the dienophile is a mixture of di(acrylates) and tri(acrylates).

7. The polyesters of claim 1 wherein the dienophile is a mixture of tri(acrylates) and mono(acrylates).

8. The polyesters of claim 1 wherein the dienophile is a mixture of di(acrylates). tri(acrylates), di(methacrylates), and tri(methacrylates).

9. Polyesters derived from the photochemical cyclopolymerization of approximately stoichiometric amounts of at least one (a) aromatic diketone selected from the group consisting of

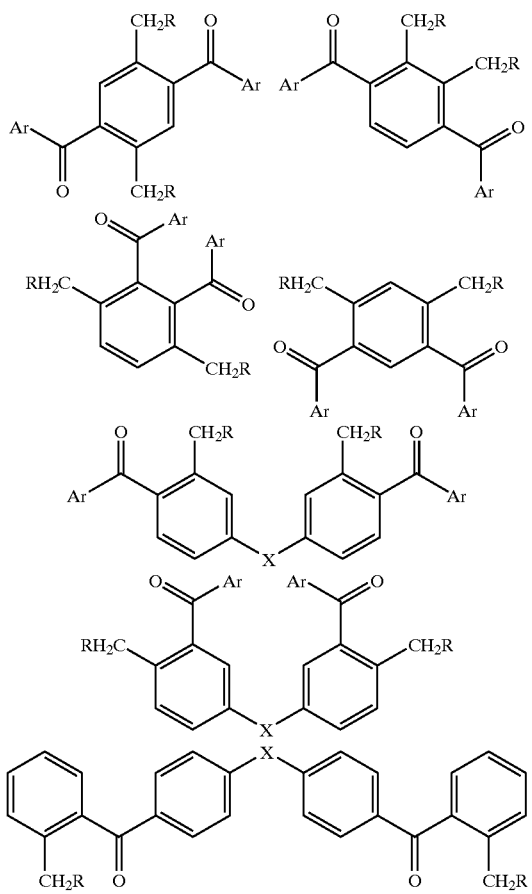

wherein Ar is the same or a different aromatic or substituted aromatic radical and R is the same or a different radical selected from the group consisting of hydrogen, aromatic radicals, lower alkyl radicals of 1 to 8 carbons, $O_2CR_1$ and $-OR_2$ radicals wherein $R_1$ and $R_2$ are the same or different radicals selected from the group consisting of lower alkyl radicals of 1 to 8 carbons, and aryl radicals, and X is selected from the group consisting of nil, oxygen, sulfur, —C=O, —$CH_2$, alkyl radicals of 1 to 8 carbons, ether radicals, and aryl radicals with at least one (b) dienophile selected from the group consisting of di(acrylates), tri(acrylates), di(methacrylates), tri (methacrylates) and mixtures thereof in any molar ratio with at least one monoacrylate wherein the monoacrylates comprise from 0 to about 25 molar percent of the mixture to obtain polyesters having glass transitions (Tg) ranging up to about 200° C., high thermal-oxidative stability and decomposition stability temperatures as high as 300° C.

10. The polyesters of claim 9 wherein the diketone has the formula:

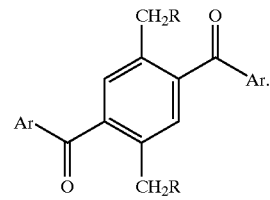

11. The polyesters of claim 10 wherein R is the radical $O_2CR_1$.

12. The polyesters of claim 10 wherein R is the radical —$OR_2$.

13. The polyesters of claim 10 wherein R is hydrogen.

14. The polyesters of claim 10 wherein R is an alkyl radical.

15. The polyesters of claim 11 wherein $R_1$ is a lower alkyl radical.

16. The polyesters of claim 11 wherein $R_1$ is an aryl radical.

17. The polyesters of claim 12 wherein $R_2$ is a lower alkyl radical.

18. The polyesters of claim 12 wherein $R_2$ is an aryl radical.

19. The polyesters of claim 9 wherein X is nil.

20. The polyesters of claim 9 wherein X is —C=O.

21. The polyesters of claim 9 wherein X is oxygen.

22. The polyesters of claim 9 wherein X is —$CH_2$.

23. The polyesters of claim 10 wherein Ar is a substituted aromatic radical.

24. A process of preparing polyesters by photochemically cyclopolymerizing at ambient temperatures approximately stoichiometric amounts of at least one (a) aromatic diketone selected from the group consisting of

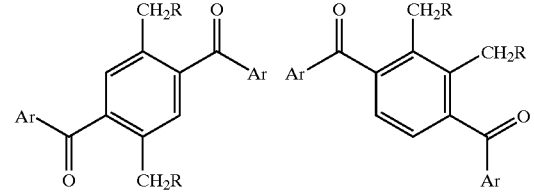

-continued

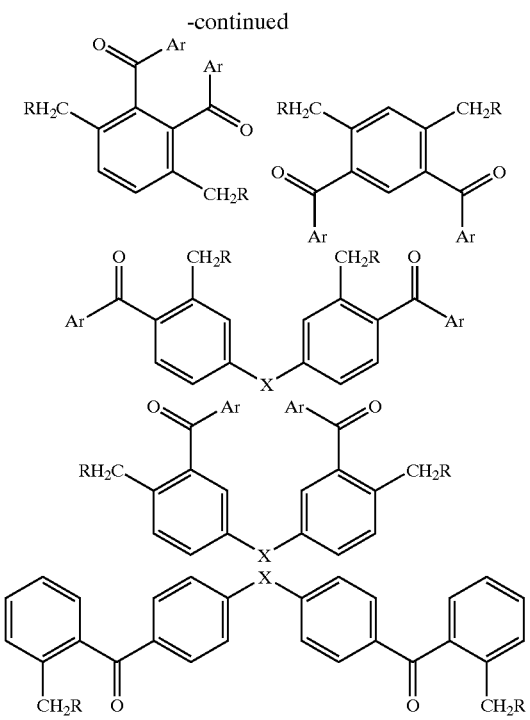

wherein Ar is the same or a different aromatic or substituted aromatic radical and R is the same or a different radical selected from the group consisting of hydrogen, aromatic radicals, lower alkyl radicals of 1 to 8 carbons, $O_2CR_1$ and $-OR_2$ radicals wherein $R_1$ and $R_2$ are the same or different radicals selected from the group consisting of lower alkyl radicals of 1 to 8 carbons, and aryl radicals, and X is selected from the group consisting of nil, oxygen, sulfur, $-C=O$, $-CH_2$, alkyl radicals of 1 to 8 carbons, ether radicals, ester radicals, and aryl radicals with at least one (b) dienophile selected from the group consisting of di(acrylates), tri(acrylates), di(methacrylates) tri (methacrylates) and a mixture thereof in any molar ratio with at least one monoacrylate wherein the monoacrylate ranges from 0 to about 25 molar percent of the mixture to obtain polyacrylates having glass transition temperatures (Tg) ranging up to about 200° C., high thermal oxidative stability and decomposition-stability temperatures ranging up to about 300° C.

25. The process of claim 24 wherein the dienophile is di(acrylate).

26. The process of claim 24 wherein the dienophile is tri(acrylate).

27. The process of claim 24 wherein the dienophile is a mixture of the acrylates and the diketone has the formula:

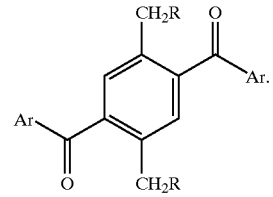

28. The process of claim 27 wherein R is an alkyl radical.
29. The process of claim 27 wherein R is hydrogen.
30. The process of claim 24 wherein R is $-OR_2$.
31. The process of claim 24 wherein R is $O_2CR_1$.
32. The process of claim 30 wherein $R_2$ is a lower alkyl radical.
33. The process of claim 31 wherein $R_1$ is a lower alkyl radical.

* * * * *